United States Patent [19]
Marsilio et al.

[11] Patent Number: 5,615,779
[45] Date of Patent: Apr. 1, 1997

[54] STORAGE AND DISPLAY RACK FOR RECORDED MEDIA

[75] Inventors: Ronald M. Marsilio, Mogadore; James T. Weisburn, Massillon; James K. Sankey, Hudson; Larry K. Mundorf, North Canton, all of Ohio

[73] Assignee: Alpha Enterprises, Inc., N. Canton, Ohio

[21] Appl. No.: 439,763

[22] Filed: May 12, 1995

[51] Int. Cl.⁶ ................................................ A47G 29/00
[52] U.S. Cl. ............................................. 211/40; D6/407
[58] Field of Search .................. 211/40, 41; 206/308.1, 206/387.1; 312/9.1; D6/407, 629, 630, 631, 632

[56] References Cited

U.S. PATENT DOCUMENTS

| | | | |
|---|---|---|---|
| D. 242,319 | 11/1976 | Ackeret | D6/407 |
| D. 318,580 | 7/1991 | Sjostrom | D6/407 |
| D. 319,741 | 9/1991 | Sylvester | D6/407 |
| D. 333,225 | 2/1993 | Robinson | D6/407 |
| D. 337,919 | 8/1993 | van der Molen | D6/407 |
| D. 346,510 | 5/1994 | Long et al. | D6/407 |
| D. 364,512 | 11/1995 | Stravitz | D6/407 |
| 4,327,835 | 5/1982 | Leger | 211/41 |
| 4,577,914 | 3/1986 | Stravitz | 206/387.14 X |
| 4,709,815 | 12/1987 | Price et al. | 206/387 |
| 5,056,669 | 10/1991 | Villeneuve | 211/40 |

*Primary Examiner*—Ramon O. Ramirez
*Assistant Examiner*—Sandra Snapp
*Attorney, Agent, or Firm*—Sand & Sebolt

[57] ABSTRACT

A rack for storing and displaying a plurality of recorded media, such as compact discs, in a vertical array. The rack has upper and lower sections, each of which has a plurality of vertical spaced compartments for slidably receiving the recorded media therein. The lower section is mounted on and extends upwardly from the base. Latching detents are formed on the top of the lower section and provide a snap-fit engagement with the bottom of the upper section to join the sections in a vertical stacked relationship. The upper and lower sections are substantially equal in length and can be placed in a disassembled knockdown condition juxtaposed to each other for storage and shipment to reduce the size of the storage box.

16 Claims, 3 Drawing Sheets

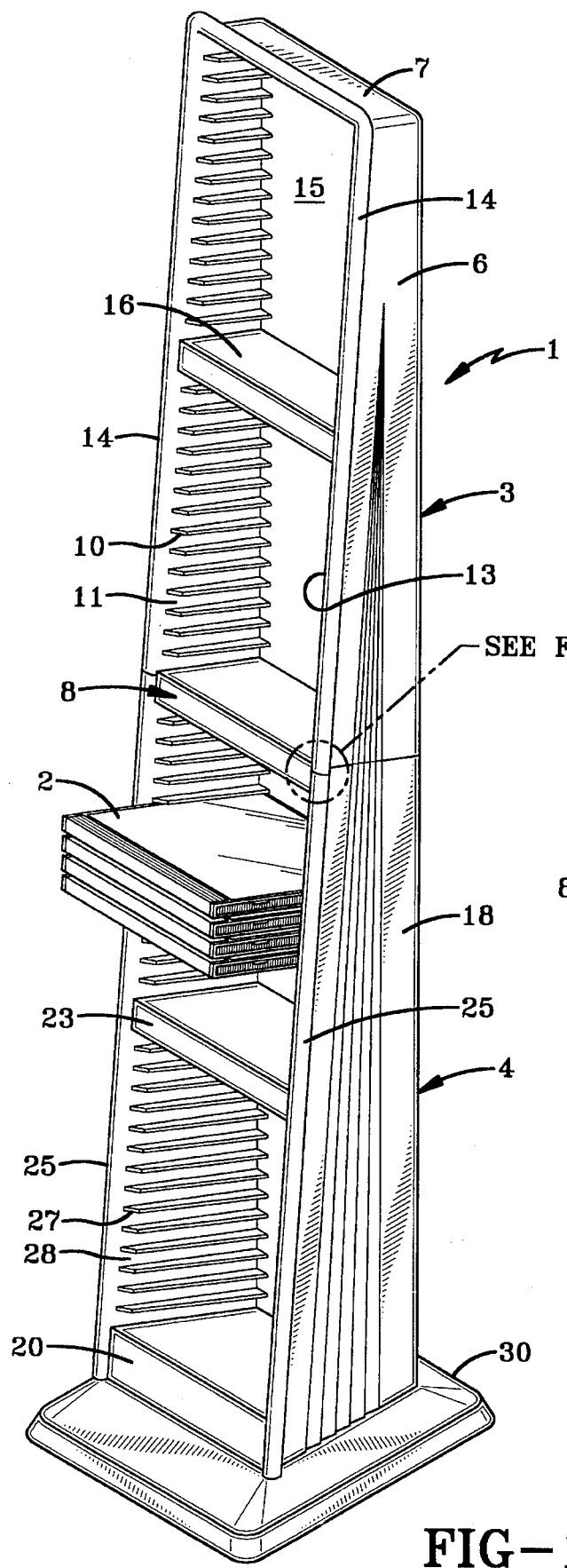
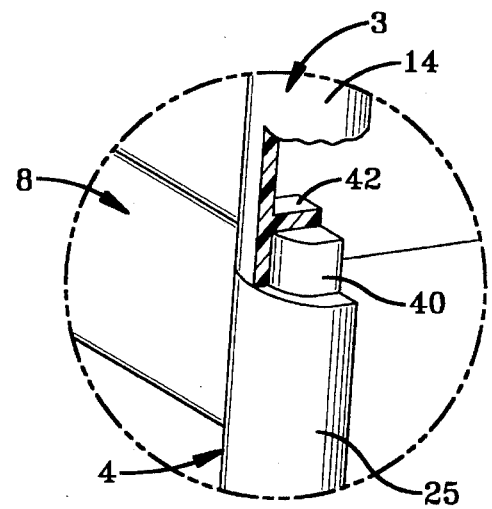
FIG-1
FIG-6

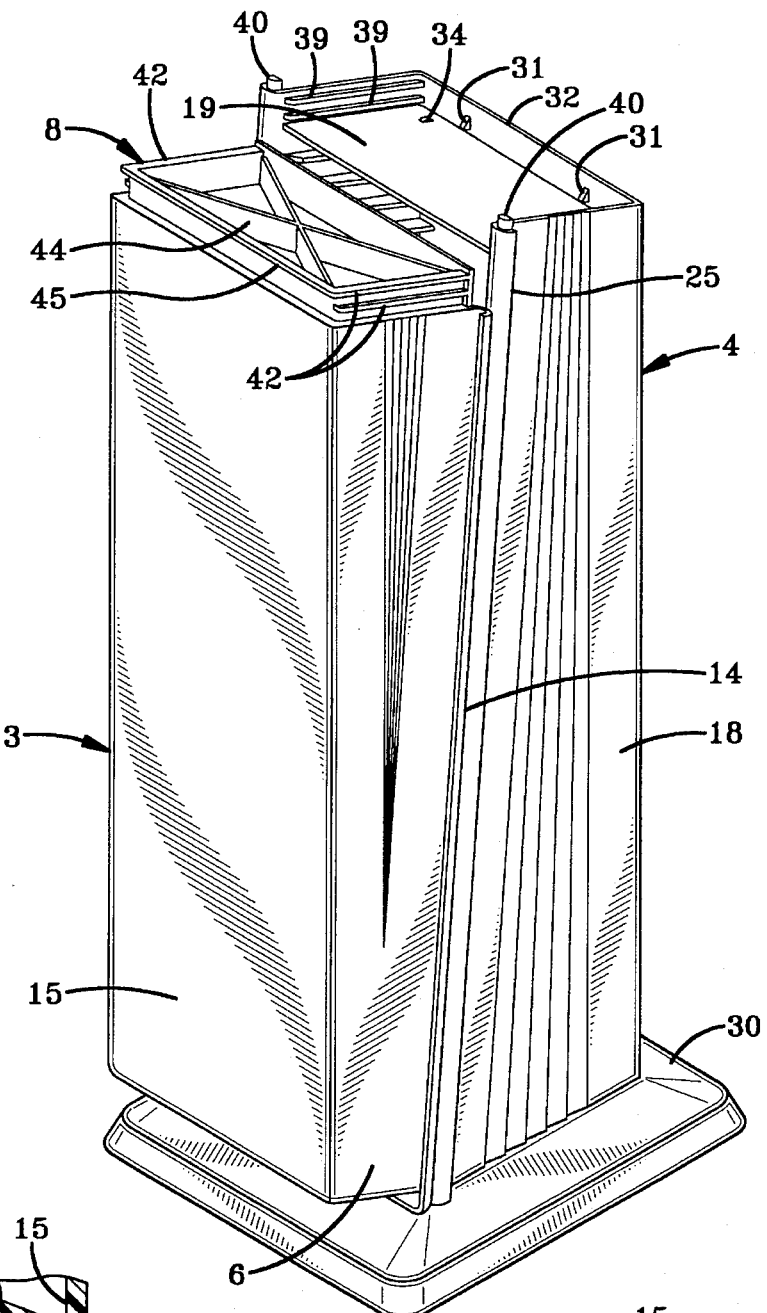
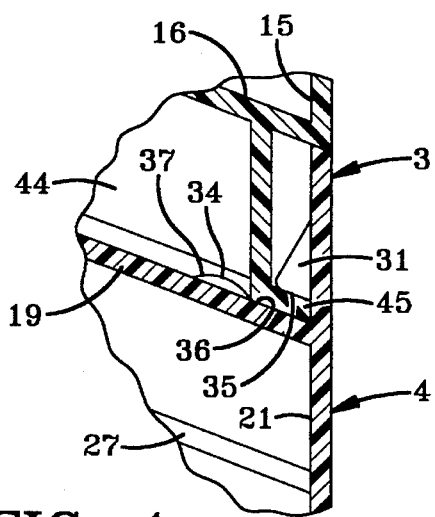
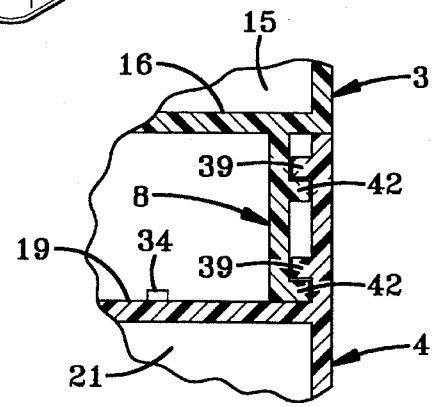
FIG-3
FIG-4
FIG-5

STORAGE AND DISPLAY RACK FOR RECORDED MEDIA

BACKGROUND OF THE INVENTION

1. Technical Field

The invention relates to a storage and display rack for recorded media, such as compact discs, video cassettes, CD ROMS, etc. More particularly, the invention relates to such a rack formed of two sections, enabling the rack to be shipped in a knockdown, compact condition for minimizing shelf space and the amount of packaging required, and which is easily assembled for display or after purchase by the consumer.

2. Background Information

Due to the increased popularity and purchase of various recorded media, such as compact discs, video cassettes, floppy discs, CD ROMS, and the like, the need has arisen for racks for storing and displaying the recorded media in an attractive fashion. One such type of storage and display rack is referred to in the industry as a tower, which is a vertically extending member, usually formed of molded plastic, and having a plurality of vertically spaced shelves which form storage slots into which the recorded medium is slidably inserted, with the outer edge of the medium being visible for review and inspection. These towers can consist of a single or multiple array of such shelves, depending upon the final configuration thereof. Two examples of such storage and display racks are shown in U.S. Pat. Nos. Des. 318,580 and Des. 346,510.

However, one common problem with such display racks, especially those having a relatively thin vertical configuration, having a considerable height and relatively narrow width, is that they require a large shelf space for storage and display. Also, they require a costly package, requiring a substantial amount of cardboard or other type of packaging material due to their unusual shape.

Therefore, the need exists for an improved storage and display rack for recorded media which can be shipped and stored in s compact condition, yet which is easily assembled, either for display in a retail store or after purchase by the consumer.

SUMMARY OF THE INVENTION

Objectives of the invention include providing an improved storage and display rack which can be stored and shipped in a knockdown condition, thereby reducing the amount of packaging material and the size thereof.

A further objective of the invention is to provide such a rack which can be formed of two integral members, each of which is molded of a sturdy and rigid plastic material, which members are then snap-fitted together for assembling the storage rack.

Another objective of the invention is to provide such a rack which is formed of two sections substantially equal in length, which when placed in juxtaposition with each other, form a generally rectangular-shaped object, which is then easily packaged and shipped in parallelpiped boxes for ease of shipment and storage, even though the shape of the final product has a relatively narrow and elongated configuration.

Still another objective of the invention is to provide such a rack which, when assembled into a unitary structure from the two components, could be disassembled if desired, but preferably will remain in a substantially permanent assembled condition for use by the ultimate consumer.

A still further objective of the invention is to provide such a storage rack which is of a relatively simple, inexpensive construction, which can be mass produced, preferably by injection molding procedures, and which provides a stable vertically extending tower for storing a plurality of recorded media in an attractive manner.

These objectives and advantages are obtained by the storage and display rack of the present invention, the general nature of which may be stated as including a base; separate upper and lower sections, each being formed with a plurality of vertically spaced compartments for receiving recorded media therein, with the lower section extending upwardly from the base; and attachment means for mounting the upper section on the lower section in a vertical stacked relationship.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 1 is a perspective view of the storage and display rack of the present invention shown in an assembled position holding four compact disc jewel boxes;

FIG. 3 is a perspective view showing the two sections of the disassembled rack in juxtaposition prior to placement in a storage and shipment box;

FIG. 4 is an enlarged fragmentary sectional view showing the latching detents joining the upper and lower sections;

FIG. 5 is another sectional view showing the connecting ribs of the upper and lower sections; and FIG. 6 is an enlarged fragmentary partial section of the encircled portion of FIG. 1.

Similar numerals refer to similar parts throughout the drawings.

DESCRIPTION OF THE PREFERRED EMBODIMENT

Figure 2:
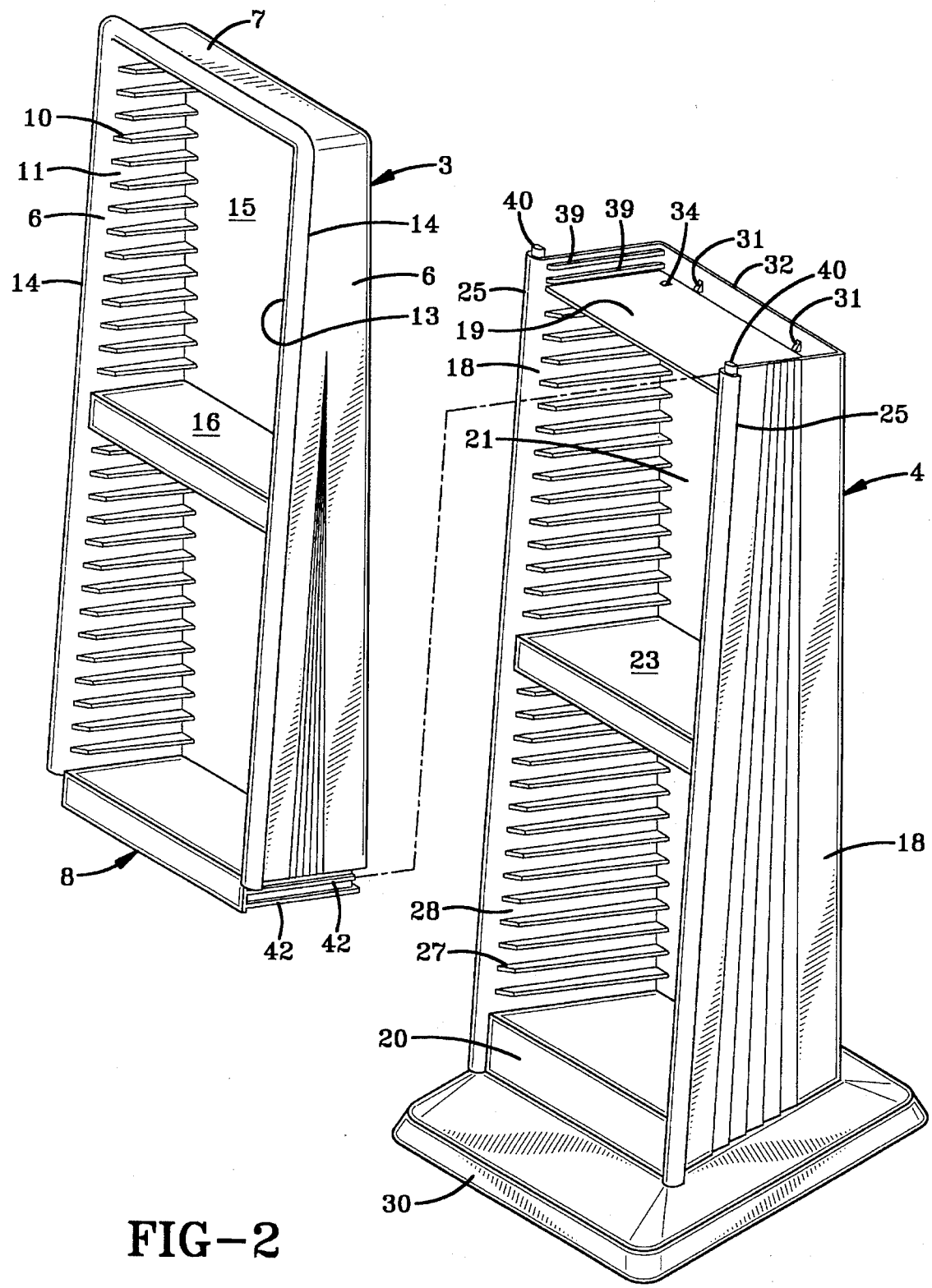
FIG. 2 is an exploded perspective view of the rack in a disassembled condition.

The improved storage and display rack of the present invention is indicated generally at 1, and is shown in FIG. 1 in an assembled position holding a plurality of compact discs which are contained in a usual storage case 2, referred to in the industry as a jewel box. Rack 1 includes two main components, an upper section, indicated generally at 3, and a lower section, indicated generally at 4.

Upper section 3 is an integral one-piece, preferably injection molded of plastic, and includes a pair of spaced generally parallel side walls 6, a top wall 7, a back wall 15, and a bottom end indicated generally at 8. A plurality of vertically spaced parallel ribs 10 are formed on the inner surface of side walls 6 and extend inwardly toward each other. Ribs 10 form a plurality of vertically spaced storage compartments 11, into which the recorded media, such as compact disc storage case 2, are slidably inserted through an open front end 13 of the storage rack. Top wall 7 and side walls 6 terminate in a U-shaped peripheral flange 14 having a generally U-shaped cross-sectional configuration which provides rigidity and stiffening to upper section 3, and which forms a part of the means for securing upper section 3 to lower section 4, as described further below. Back wall 15 preferably extends between side wall 6, top wall 7 and bottom end 8, and encloses the back end of upper section 3.

A reinforcing member 16 which provides a shelf-like configuration, extends between side walls 6 generally intermediate top wall 7 and bottom end 8. Member 16 increases the rigidity of upper section 3 and assists in maintaining the parallel alignment of side walls 6.

Lower section 4 also includes a pair of spaced parallel side walls 18, a top wall 19 and a bottom end 20 (FIG. 2), and a rear wall 21. Lower section 4 preferably is a one-piece plastic injection-molded member, wherein side walls 18, top wall 19, bottom end 20 and rear wall 21 are integrally joined. A reinforcing member 23, similar to reinforcing member 16, is formed integrally with side walls 18 and back wall 21, and extends therebetween, generally intermediate top wall 19 and bottom end 20, to increase the lateral stability of lower section 4. Side walls 18 terminate in vertically extending peripheral flanges 25 which have a U-shaped cross-sectional configuration similar to flanges 14 of upper section 3. A plurality of vertically spaced ribs or shelf-forming members 27 are formed on an inside surface of each side wall 18 and are spaced vertically therealong, to form the plurality of vertically spaced slots or storage compartments 28 for slidably receiving the recorded media therein.

A supporting base, indicated at 30, is preferably formed integrally with lower section 4, as shown in the drawings, or could be formed as a separate component for subsequent assembly with lower section 4. Base 30 has a rectangular, preferably square, configuration and extends beyond the periphery of lower section 4 to provide a stable supporting base for the upper and lower sections when assembled, as shown in FIG. 1

In accordance with one of the main features of the invention, attachment means are provided for mounting upper section 3 on lower section 4 for assembling the two individual members, as shown in FIG. 2, into the final assembled condition, as shown in FIG. 1. The attachment means includes a pair of locking detents 31, which are formed integrally on rear wall 21 of lower section 3 adjacent to a top peripheral edge 32 thereof (FIGS. 2–5), and a second pair of locking detents 34 formed integrally with and projecting upwardly from top wall 19. As shown particularly in FIG. 4, locking detents 31 have a generally triangular configuration with a lower edge 35 which forms a slot 36 with the adjacent surface of top wall 19. Locking detents 34 preferably have a ramped front surface 37, the function of which is described further below.

The attachment means further includes a pair of spaced parallel ribs 39 formed on the upper inner surface of each side wall 18 (FIG. 2). Also, a pair of oval-shaped projections 40 are formed on the top ends of peripheral flanges 25 of lower section 3 and extend a short distance beyond top peripheral edge 32.

Upper section 3 includes attachment means complementary to and matingly engageable with the attachment means of lower section 4. The upper section attachment means includes a pair of spaced parallel ribs 42 which extend along both sides of bottom end 8. Ribs 42 are slidably received and engaged with ribs 39 of lower section 4, as shown in FIG. 5, to prevent vertical movement between the upper and lower sections when joined.

As best shown in FIG. 3, bottom end 8 of upper section 3, in addition to locking ribs 42, includes an X-shaped reinforcing brace 44 to provide rigidity to bottom end 8, and includes a flange 45 extending along the rear portion of bottom end 8 in the same plane with lowermost ribs 42.

As discussed above, to mount and secure upper section 3 on lower section 4, the ribs are slidably engaged with each other, as shown in FIG. 5. Peripheral flange 45 of upper section 3 is slidably inserted into slot 36 between locking detents 31 and the top surface of top wall 19 and is snap-fitted behind locking detents 34 to lock the joined upper and lower sections together, as shown in FIG. 4. Oval projections 40 will extend into the interior of the bottom portion of U-shaped peripheral flanges 14 of side walls 6 of upper section 3, as shown in FIG. 6, preventing further movement of the upper and lower sections.

Thus, the combination of locking detents 31 and 34 which trap and secure peripheral flange 45 therebetween, together with the sliding engagement of ribs 39 and 42, and the engagement of projections 40 within peripheral flanges 14 of upper section 3, provide for a secure snap-fit engagement and joinder of upper section 3 on lower section 4. Top wall 19 of lower section 4 will have sufficient flexibility to enable peripheral flange 45 of upper section 3 to slide up ramped front surfaces 37 of detents 34 and snap behind the detents to firmly and securely retain upper section 3 on lower section 4.

Furthermore, reinforcing members 23 and 16, together with bottom ends 8 and 20, provide a very stable vertically extending member for storing and displaying a considerable number of recorded media, one example of which is shown in FIG. 1. Enlarged base 30 provides the necessary support for the joined sections, and, as indicated previously, could be molded integrally with lower section 4 or formed as a separate component for subsequent mounting thereto.

In accordance with another feature of the invention, rack 1, when in a disassembled position, assumes a generally rectangular configuration, as shown in FIG. 3, upon placing upper section 3 against lower section 4, with the peripheral flanges 14 and 25 being in juxtaposition with each other. This enables the knockdown rack to be stored conveniently within a generally parallelpiped cardboard box, which enables a plurality of the racks to be shipped and stored on shelves considerably more conveniently than would be possible if the cardboard packaging had to accommodate the elongated assembled tower configuration, as shown in FIG. 1.

It is easily seen by viewing FIG. 1 that the storage box would have an extremely long configuration requiring additional packaging material, and would be extremely difficult to store on shelves or be stacked in a larger shipping box or pallet for initial transfer from a manufacturing plant to a retail establishment or distribution warehouse.

Although side walls 6 and 18, have an upwardly inclined configuration, as shown in FIG. 1, they could have a rectangular configuration throughout their length, without affecting the storage rack, if desired. Also, double rows of horizontally spaced, vertically extending storage slots, somewhat similar to that shown in U.S. Pat. No. Des. 346,510, could be utilized with the knockdown storage rack of the present invention without affecting the concept of the invention and still be assembled and shipped in a knockdown position and subsequently reassembled by the snap-fit engagement of the upper and lower sections. Also, video cassettes, floppy discs, CD ROMS, or various other types of recorded media, and other flat objects, could be slidably received within the spaced storage compartments for ease of storage and display. It is also readily understood that the storage rack could have front closure doors, and need not have an exposed open front end, as shown in the particular embodiment of the present drawings.

Accordingly, the storage and display rack is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved storage and display rack is constructed and used, the characteristics of the construction, and the advantageous, new and useful results obtained; the new and useful structures, devices, elements, arrangements, parts and combinations, are set forth in the appended claims.

We claim:

1. A rack for the storage and display of recorded media including:

a base;

separate upper and lower sections, each being formed with a plurality of vertically spaced compartments for receiving recorded media therein, said lower section extending upwardly from the base;

said upper and lower sections having longitudinal lengths substantially equal to each other, with said upper section being in juxtaposition with said lower section on the base forming a generally rectangular parallelpiped configuration with said base when in a disassembled position; and attachment means for mounting the upper section on the lower section in a vertical stacked relationship when in an assembled position.

2. The rack defined in claim 1 in which each of the upper and lower sections includes a pair of spaced side walls and a back wall; and in which each of said sections is formed with an open front between said side walls for providing access to the spaced compartments.

3. The rack defined in claim 2 including shelf means located between the side walls of the upper and lower sections for forming a portion of the spaced compartments and for supporting the recorded media thereon.

4. The rack defined in claim 1 in which the lower section and base are an integral one-piece member.

5. The rack defined in claim 2 in which the side walls terminate in front edges substantially U-shaped in cross section.

6. The rack defined in claim 2 in which at least one reinforcing member is formed on each of the upper and lower sections and extends between the side walls and is located generally intermediate spaced top and bottom ends of each of said sections.

7. The rack defined in claim 1 in which the attachment means includes latching detents formed on the lower section; and in which said detents provide a snap-fit engagement with a cooperating member formed on the upper section.

8. The rack defined in claim 7 in which the lower section includes a top wall extending between the side walls and back wall; in which at least one of the latching detents is formed on the back wall adjacent said top wall and another of said latching detents is formed on said top wall adjacent said back wall; and in which the cooperating member of the upper section is snap-fitted between said detents.

9. The rack defined in claim 5 in which a projecting member extends upwardly from each of the side walls of the lower section; and in which said projecting members matingly engage lower ends of the side walls of the upper section.

10. The rack defined in claim 1 in which the lower section and base is an integral one-piece member of molded plastic; in which the upper section is a one-piece member of molded plastic; and in which the attachment means includes a plurality of latching detents formed integrally with the lower section and a latching flange formed integrally with the upper section.

11. The rack defined in claim 1 in combination with a recorded medium; and in which the recorded medium is a compact disc.

12. A rack for the storage and display of recorded media including:

a base;

separate upper and lower sections, each being formed with a plurality of vertically spaced compartments for receiving recorded media therein, said lower section extending upwardly from the base, each of said upper and lower sections including a pair of spaced side walls and back wall and an open front formed between said side walls for providing access to the spaced compartments, said side walls terminating in front edges substantially U-shaped in cross section; and attachment means for mounting the upper section on the lower section in a vertical stacked relationship, said attachment means including a projecting member extending upwardly from each of the side walls of the lower section and matingly engaging lower ends of the side walls of the upper section.

13. A rack for the storage and display of recorded media including:

a base;

separate upper and lower sections, each being formed with a plurality of vertically spaced compartments for receiving recorded media therein, said lower section extending upwardly from the base and having a top wall extending between the side walls and back wall; and attachment means for mounting the upper section on the lower section in a vertical stacked relationship, said attachment means including latching detents formed on the lower section providing a snap-fit engagement with a cooperating member formed on the upper section with at least one of the latching detents being formed on the back wall adjacent the top wall and another of said latching detents being formed on the top wall adjacent said back wall, with the cooperating member of the upper section being snap-fitted between said detents, and ribs formed on the side walls of the upper and lower sections, with the ribs of the lower section being slidably engaged with the ribs of the upper section to form part of the attachment means for mounting the upper section on the lower section.

14. The rack defined in claim 13 in which the attachment means further includes ribs formed on the side walls of the upper and lower sections; and in which the ribs of the lower section are slidably engaged with the ribs of the upper section to form part of the attachment means for mounting the upper section on the lower section.

15. The rack defined in claim 14 in which the upper section includes a latching flange extending about at least a portion of the upper section spaced from the back wall of said upper section; and in which said latching flange forms the cooperating member which is snap-fitted between the detents.

16. The rack defined in claim 15 in which at least a pair of detents is are formed on the top wall of the lower section; in which said pair of detents have ramped surfaces; and in which the latching flange moves over said ramped surfaces when snap-fitted into engagement with the detents.

* * * * *